(12) United States Patent
Gieras et al.

(10) Patent No.: US 8,148,867 B2
(45) Date of Patent: Apr. 3, 2012

(54) PERMANENT MAGNET BRUSHLESS MACHINE WITH MAGNETIC FLUX REGULATION

(75) Inventors: Jacek F. Gieras, Glastonbury, CT (US); Gregory I. Rozman, Rockford, IL (US); Andreas C. Koenig, Machesney Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 383 days.

(21) Appl. No.: 12/538,650

(22) Filed: Aug. 10, 2009

(65) Prior Publication Data

US 2011/0031841 A1 Feb. 10, 2011

(51) Int. Cl.
*H02K 21/00* (2006.01)
(52) U.S. Cl. ........................................ 310/209; 310/185
(58) Field of Classification Search ........... 310/216.007, 310/216.018, 209, 198, 191, 184–187
See application file for complete search history.

(56) References Cited

U.S. PATENT DOCUMENTS 7,265,539 B2 * 9/2007 Rutkowski et al. ........ 324/207.2
* cited by examiner

*Primary Examiner* — Dang Le
(74) *Attorney, Agent, or Firm* — Stephen G. Mican

(57) ABSTRACT

A permanent magnet machine (PMM) has a generally cylindrical permanent magnet (PM) rotor that has multiple PM rotor poles arranged around a rotor axis of rotation; and a stator with two generally cylindrical and concentric yokes, an inner yoke proximate the PM rotor with associated multiple inner poles and inner armature windings suitable for multiphase alternating current operation that form a PMM magnetic flux circuit, an outer yoke with associated multiple outer poles and outer control windings suitable for connection to a direct current source, with distal ends of the outer poles in contact with the inner yoke to form an external magnetic flux circuit that diverts magnetic flux from the PMM magnetic flux circuit; wherein application of increasing direct current to the outer windings results in increased magnetic reluctance of the external magnetic flux circuit, thereby causing the external magnetic flux circuit to divert less magnetic flux from the PMM magnetic flux circuit.

25 Claims, 8 Drawing Sheets

PERMANENT MAGNET BRUSHLESS MACHINE WITH MAGNETIC FLUX REGULATION

FIELD OF THE INVENTION

The invention relates to electric machines that have a permanent magnet rotor, and more particularly to permanent magnet machines that have a control winding for magnetic flux regulation.

BACKGROUND OF THE INVENTION

There have been various proposals for multiphase electric machines of the permanent magnet type that include magnetic flux regulation by way of a control current to regulate their electromotive force (EMF) in a generating mode and developed torque in a motor mode. However, such proposals have generally involved machines of complex and costly design that have excessive weight and poor heat dissipation.

SUMMARY OF THE INVENTION

The invention generally comprises a permanent magnet machine (PMM) comprising: a generally cylindrical permanent magnet (PM) rotor that comprises multiple PM rotor poles arranged around a rotor axis of rotation; and a stator with two generally cylindrical and concentric yokes, an inner yoke proximate the PM rotor with associated multiple inner poles and inner armature windings suitable for multiphase alternating current operation that form a PMM magnetic flux circuit, an outer yoke with associated multiple outer poles and outer windings suitable for connection to a direct current source, with distal ends of the outer poles in contact with the inner yoke to form an external magnetic flux circuit that diverts magnetic flux from the PMM magnetic flux circuit; wherein application of increasing direct current to the outer windings results in increased magnetic reluctance of the external magnetic flux circuit, thereby causing the external magnetic flux circuit to divert less magnetic flux from the PMM magnetic flux circuit.

DETAILED DESCRIPTION OF THE INVENTION

Figure 1:
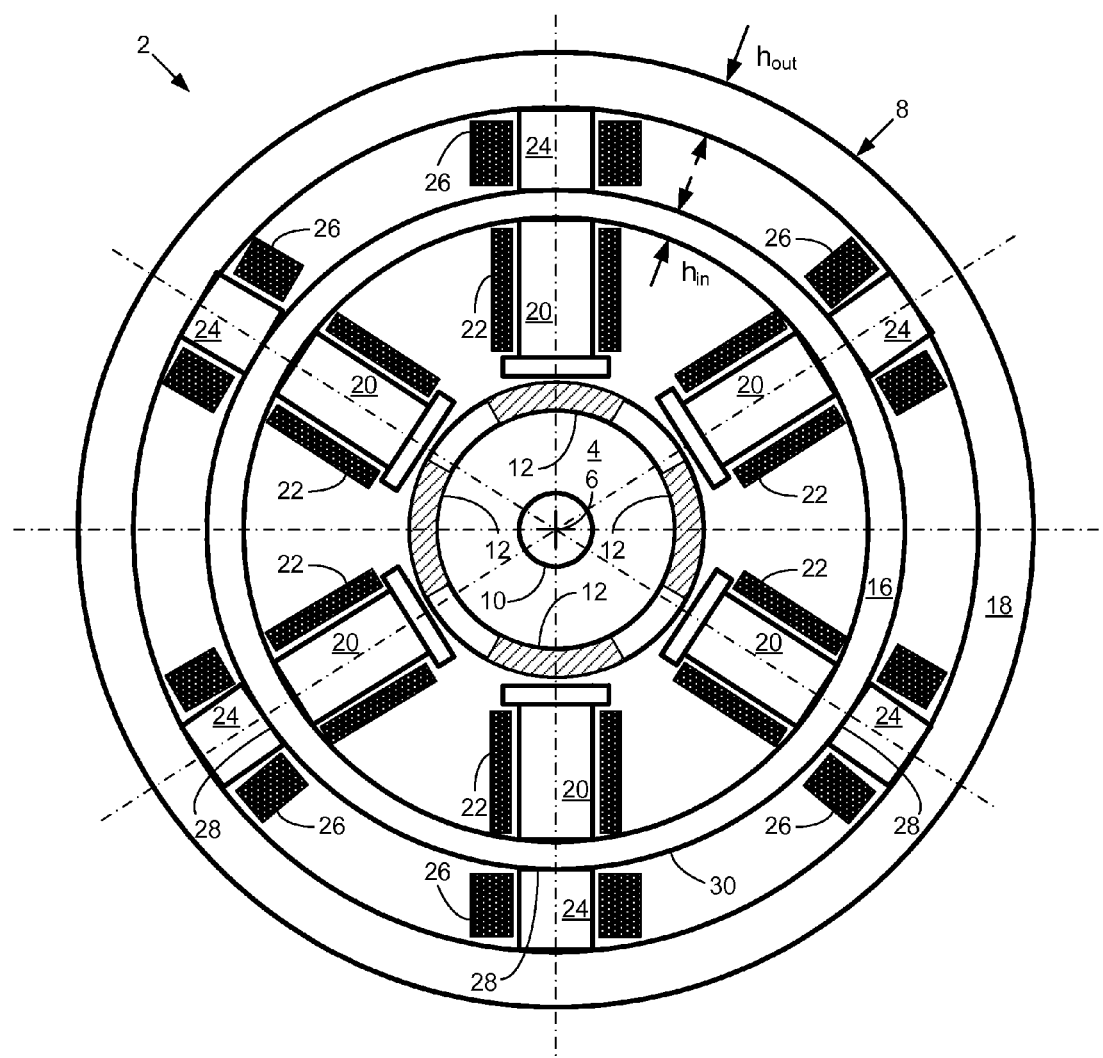
FIG. 1 is a cut-away end view of a PMM according to a first possible embodiment of the invention.
Figure 2:
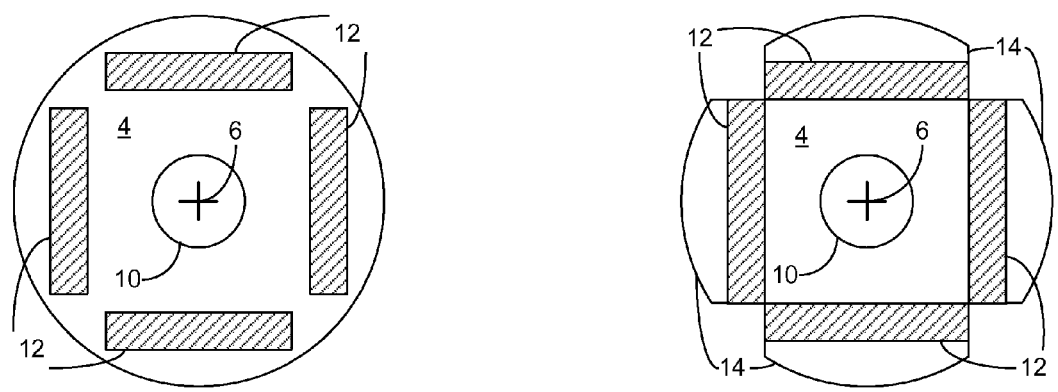
FIG. 2 shows alternate arrangements of the rotor for the PMM shown in FIG. 1.

FIG. 1 is a cut-away end view of a PMM 2 according to a first possible embodiment of the invention. It comprises a PM rotor 4 that revolves about a rotor axis of rotation 6 and a stator 8. The rotor 4 typically rotates with a coupled drive shaft 10 that has an axis of rotation coincident with the rotor axis 6. By way of illustration only, the rotor 4 has four PM rotor poles 12 arranged about the rotor axis that comprise surface mounted PMs. The rotor 4 may have a different number of rotor poles 12, and the rotor poles 12 may have a different configuration. For instance, FIG. 2 shows the rotor 4 with two alternate configurations for the rotor poles 12, one with the rotor poles 12 comprising PMs embedded in the rotor 4 and another with the rotor poles 12 comprising PMs mounted with associated ferromagnetic pole faces 14.

The stator 8 has two generally cylindrical yokes, an inner yoke 16 and an outer yoke 18. The inner yoke 16 is proximate the PM rotor 4 and it has associated multiple inner poles 20 and inner armature windings 22 that are suitable for multiphase alternating current (AC) operation to form a PMM magnetic flux circuit. The outer yoke 18 envelopes the inner yoke 16 and it has associated multiple outer poles 24 and outer control windings 26 suitable for connection to a direct current control source, with distal ends 28 of the outer poles 24 in contact with an outer surface 30 of the inner yoke 16 to form an external magnetic flux circuit that diverts magnetic flux from the PMM magnetic flux circuit.

The PMM 2 according to the first embodiment shown in FIG. 1 has inner poles 20 and outer poles 24 of the salient type. By way of example only, the inner armature windings 22 and the outer control windings 26 are concentrated coils of one slot coil pitch. The external magnetic circuit, comprising the outer yoke 18 and the outer poles 24, should have a very low level of magnetic reluctance so that a large portion of the magnetic flux in the PMM magnetic flux circuit will divert through it. Since the magnetic flux in the inner yoke 16 varies with time, the outer yoke 18 and the outer poles 24 should comprise ferromagnetic laminations or sintered magnetic powder.

If the stator 8 comprises a homogeneous material and construction of magnetic permeability $\mu_1$, the outer yoke 18 should have a radial thickness $h_{out}$ that is substantially greater than the radial thickness $h_{in}$ of the inner yoke 16 to insure that the level of magnetic reluctance in the external magnetic circuit is suitably less than that of the PMM magnetic circuit. To satisfy this condition, it is preferable that the radial thickness $h_{out}$ of the outer yoke 18 is greater than or equal to four times the radial thickness $h_{in}$ of the inner yoke 16. Alternatively, if the stator 8 does not comprise a homogeneous material and construction but the inner yoke has a magnetic permeability $\mu_1$, the outer yoke 18 may have approximately the same radial thickness as the inner yoke 16 if the outer yoke 18 comprises a material and construction such that it has a magnetic permeability $\mu_2$ that is substantially greater than magnetic permeability $\mu_1$. In this case, it is preferable that the magnetic permeability $\mu_2$ is greater than or equal to four time the magnetic permeability $\mu_1$. Of course, the outer yoke 18 may similarly have a combination of greater radial thickness and magnetic permeability than the inner yoke 16 to achieve the desired level of magnetic reluctance. The outer control windings 26 generally couple to each other in a series-connected or parallel-connected configuration so that a direct current control signal $I_C$ applied to them will lower the magnetic permeability of the external magnetic circuit and therefore increase its magnetic reluctance in proportion to the level of $I_C$.

The number of outer poles 24 should be at least the number of PM rotor poles 12. The PMM 2 in FIG. 1 shows six of the outer poles 24 by way of example only. For this embodiment, with its inner armature windings 22 comprising concentrated coils of one slot coil pitch, the number of inner poles 20 should satisfy the condition $$\frac{N}{GCD(N, 2p)} = km_1$$

wherein N is the number of inner poles 20, 2p is the number of PM rotor poles 12, $m_1$ is the number of phases of the multiphase AC of the inner armature windings 22, GCD is the greatest common divisor of N and 2p, and k=1,2,3, .... For example, if the PMM 2 as shown in FIG. 1 has N=6, $m_1$=3 and 2p=4, then $$\frac{N}{GCD(N, 2p)} = km_1 = \frac{6}{GCD(6, 4)} = \frac{6}{2} = 3$$

where GDC(6,4)=2 and k=1.

In a generating mode, a prime mover (not shown) coupled to the drive shaft 10 rotates the PM rotor 4. The magnetic flux $\Phi_{PM}$ that the rotating PM rotor generates in the stator 8 primarily flows through the external magnetic circuit. Thus, although the total magnetic flux $\Phi_{PM}$ equals the magnetic flux $\Phi$ of the PMM inner magnetic circuit plus the magnetic flux $\Phi_C$ of the external magnetic circuit, with little or no control current $I_C$, $\Phi_C$ is approximately equal to $\Phi_{PM}$. In other words, the magnetic flux that the PM rotor 4 produces represented by $$\Phi_{PM} \approx \Phi_C \propto \frac{N_C I_C}{R},$$

generates a level of EMF in the stator 8 represented by EMF≈$k_E \Phi_{PM} n$, where $N_C$ is the total number of turns of the outer windings 24, $I_C$ is the control current, R is the magnetic reluctance of the outer yoke 18, $k_E$ is the EMF constant and n is the rotational speed of the PM rotor 4.

Figure 3:
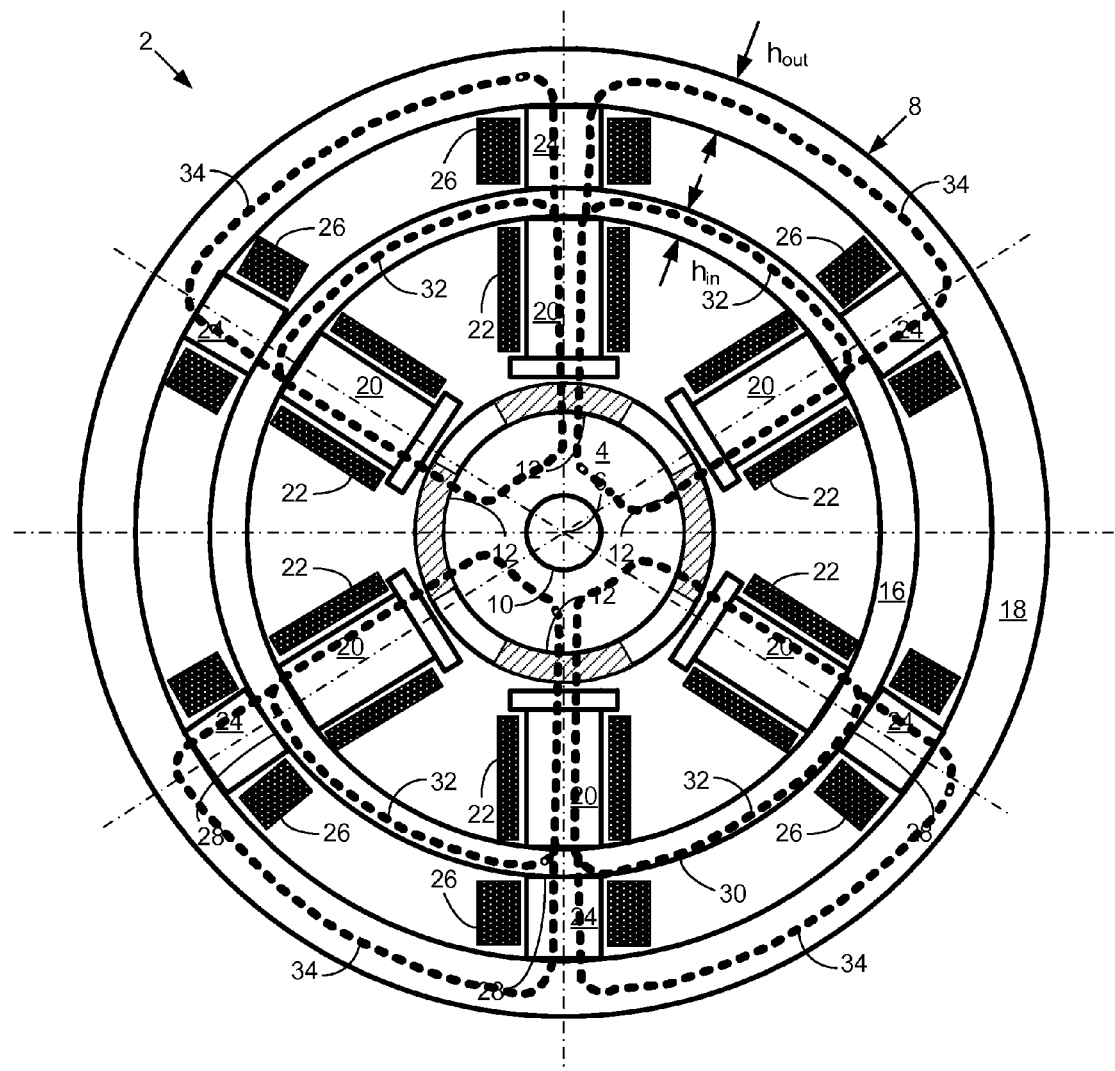
FIG. 3 is a cut-away end view of the PMM shown in FIG. 1 that shows stator magnetic flux paths for a zero or low level of control current.

FIG. 3 is a cut-away end view of the PMM 2 shown in FIG. 1 that shows stator magnetic flux paths for a zero or low level of control current $I_C$ when operating in a generating mode within a three-phase alternating current system. PMM magnetic flux paths 32 pass through the PMM magnetic circuit in the inner yoke 16 and represent the magnetic flux $\Phi$ of the PMM magnetic circuit. External magnetic flux paths 34 pass through the external magnetic circuit in the outer yoke 18 and represent the magnetic flux $\Phi_C$ of the external magnetic circuit. Since the total magnetic flux $\Phi_{PM}$ equals the magnetic flux $\Phi$ of the PMM magnetic circuit plus the magnetic flux $\Phi_C$ of the external magnetic circuit, with little or no control current $I_C$, $\Phi_C$ is approximately equal to $\Phi_{PM}$ because most of the magnetic flux travels through the external magnetic flux paths 34. The low reluctance path of $\Phi_C$ through the external magnetic circuit allows the PM rotor 4 to induce a high level of EMF into the inner armature windings 22.

Figure 4:
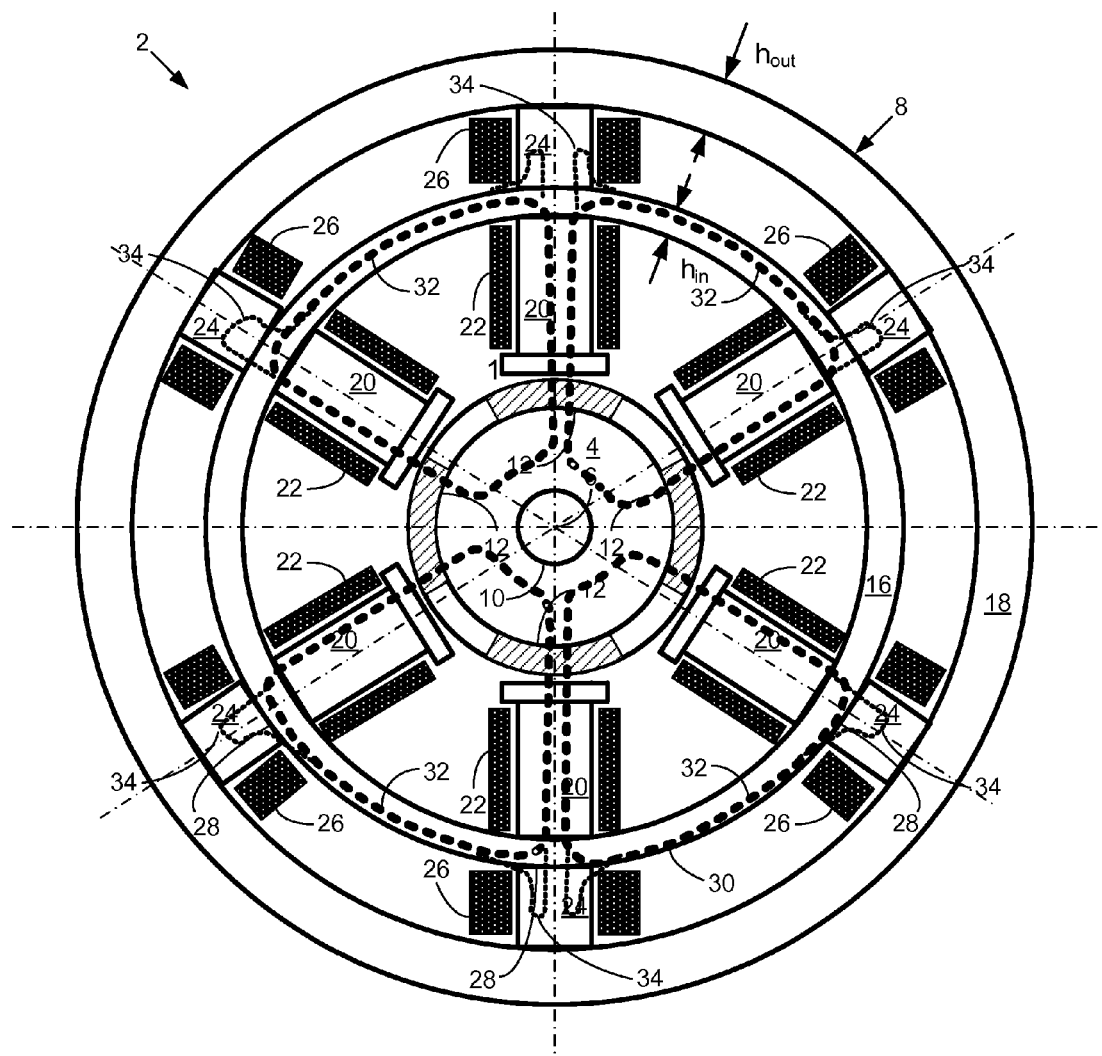
FIG. 4 is a cut-away end view of the PMM shown in FIG. 1 that shows stator magnetic flux paths for a high level of control current.

FIG. 4 is a cut-away end view of the PMM 2 shown in FIG. 1 that shows stator magnetic flux paths for a high level of control current $I_C$ in a generating mode. With a high level of control current $I_c$, the magnetic reluctance of the external magnetic circuit represented by the external magnetic flux paths 34 is high, forcing most of the total magnetic flux $\Phi_{PM}$ through the PMM magnetic circuit represented by the PMM magnetic flux paths 32. However, the high reluctance path of $\Phi$ through the PMM magnetic circuit forces the PM rotor 4 to induce a lower level of EMF into the inner windings 22.

Figure 5:
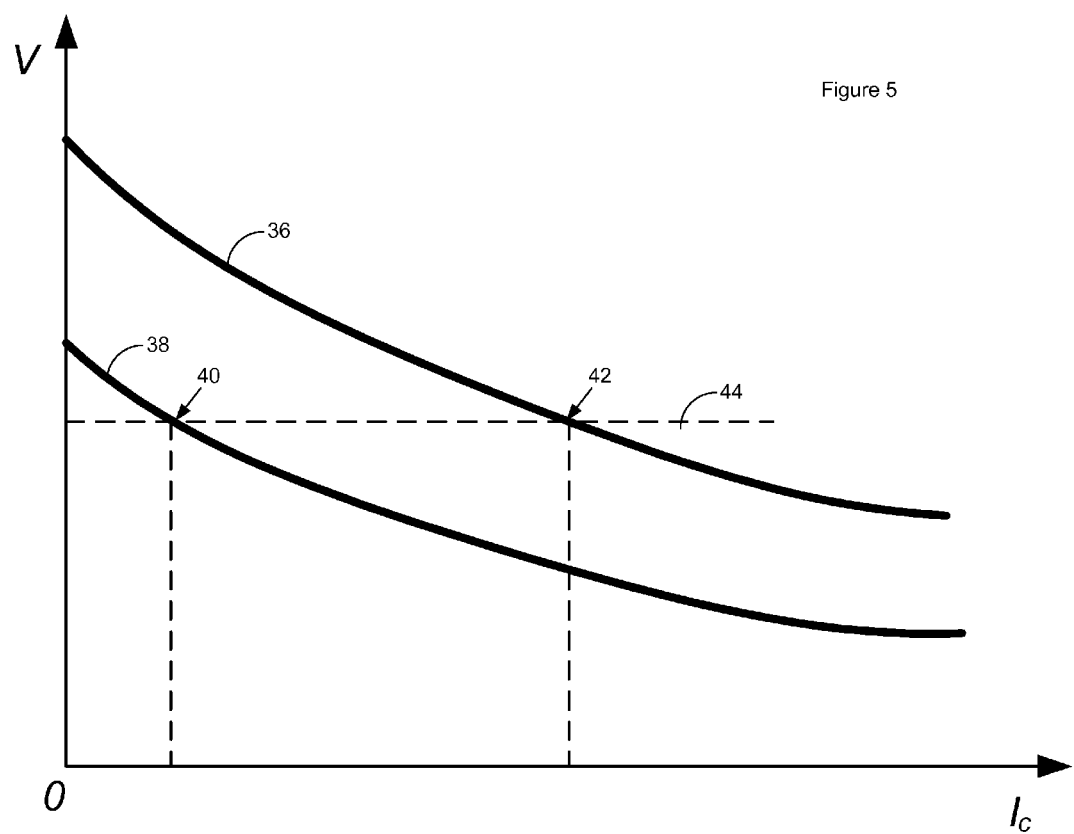
FIG. 5 is a graphical representation of EMF as a function of control current for the PMM in a generating mode.

FIG. 5 is a graphical representation of EMF as a function of control current $I_C$ for the PMM 2 in a generating mode for two different rotational speeds of the PM rotor 4. Constant speed line 36 represents a rotational speed $n_1$ and constant speed line 38 represents a rotational speed $n_2$ that is less than speed $n_1$. By adjusting the level of control current $I_C$ between level $I_{C2}$, represented by point 40, and level $I_{C1}$, represented by point 42, along constant EMF line 44, it is possible to maintain constant EMF output from the PMM 2 between speeds $n_2$ and $n_1$.

Figure 6:
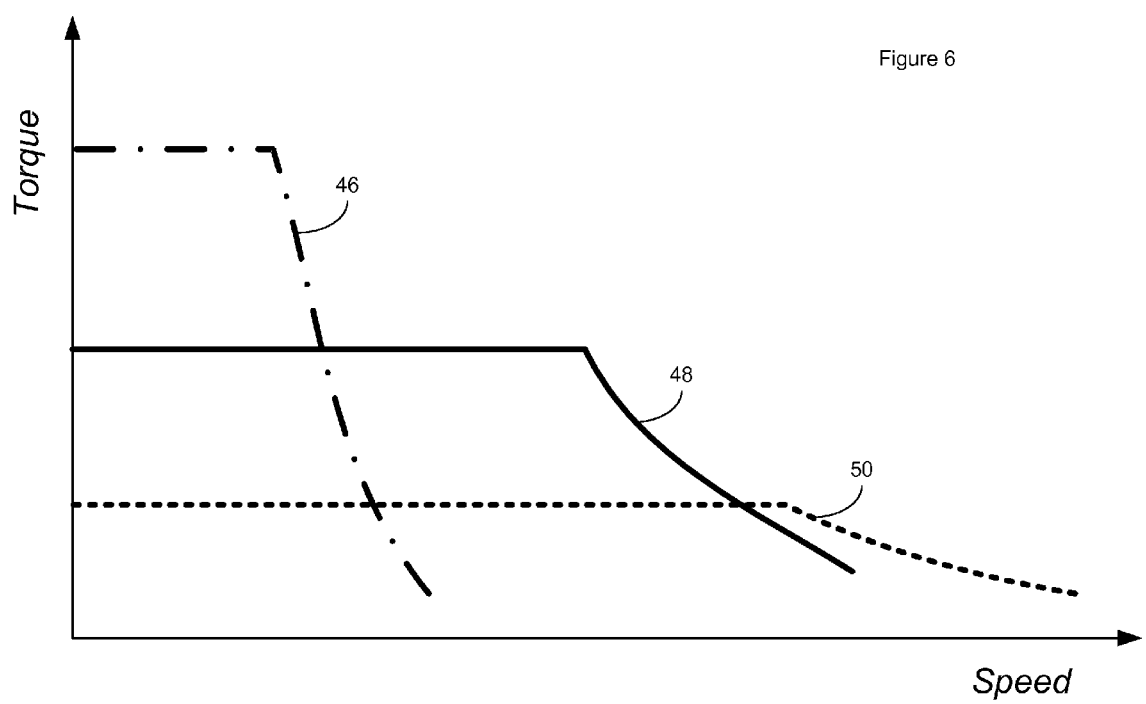
FIG. 6 is a graphical representation of torque as a function of speed for the PMM in a motor mode.

In a motor mode, increasing the level of the control current $I_C$ serves to reduce the torque that the PMM 2 develops in the PM rotor 4, thereby allowing a high degree of developed torque at low rotational speeds of the PM rotor 4 and high speed operation at lower levels of developed torque. FIG. 6 is a graphical representation of torque as a function of speed for the PMM 2 with three different levels of control current $I_C$. Constant current line 46 represents torque as a function of speed for $I_C$ equal to zero, constant current line 48 represents torque as a function of speed for an intermediate level of control current $I_{C1}$, and constant current line 50 represents torque as a function of speed for a high level of control current $I_{C2}$ that is greater than $I_{C1}$. It is evident that with $I_C$ equal to zero, the PMM 2 develops high torque, but its maximum speed is limited. With control current $I_{C1}$, the PMM 2 develops a lower level of torque but may reach higher speed. With control current $I_{C2}$, the PMM 2 develops still lower torque but may reach a still higher speed.

Figure 7:
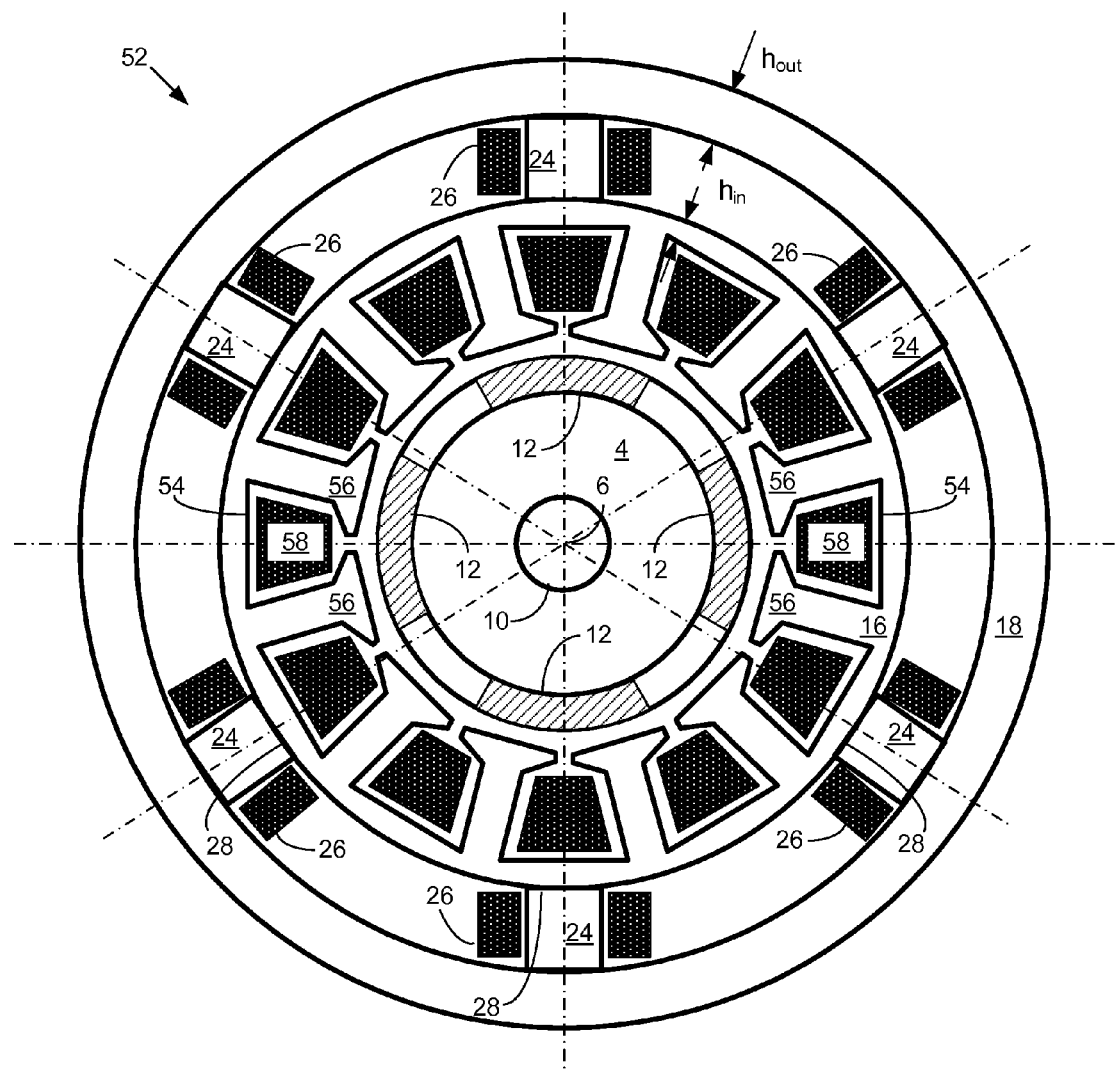
FIG. 7 is a cut-away end view of a PMM according to a second possible embodiment of the invention.

FIG. 7 is a cut-away end view of a PMM 52 according to a second possible embodiment of the invention. It is much the same as the PMM 2 shown in FIG. 1, but multiple slots 54 in the inner yoke 16 form non-salient inner poles 56. This embodiment allows the use of distributed multiple inner armature windings 58, in which case the number of alternating current phases, selection of slots 54 and inner armature windings 58 determine the effective number of poles coupled to the inner yoke 16.

Figure 8:
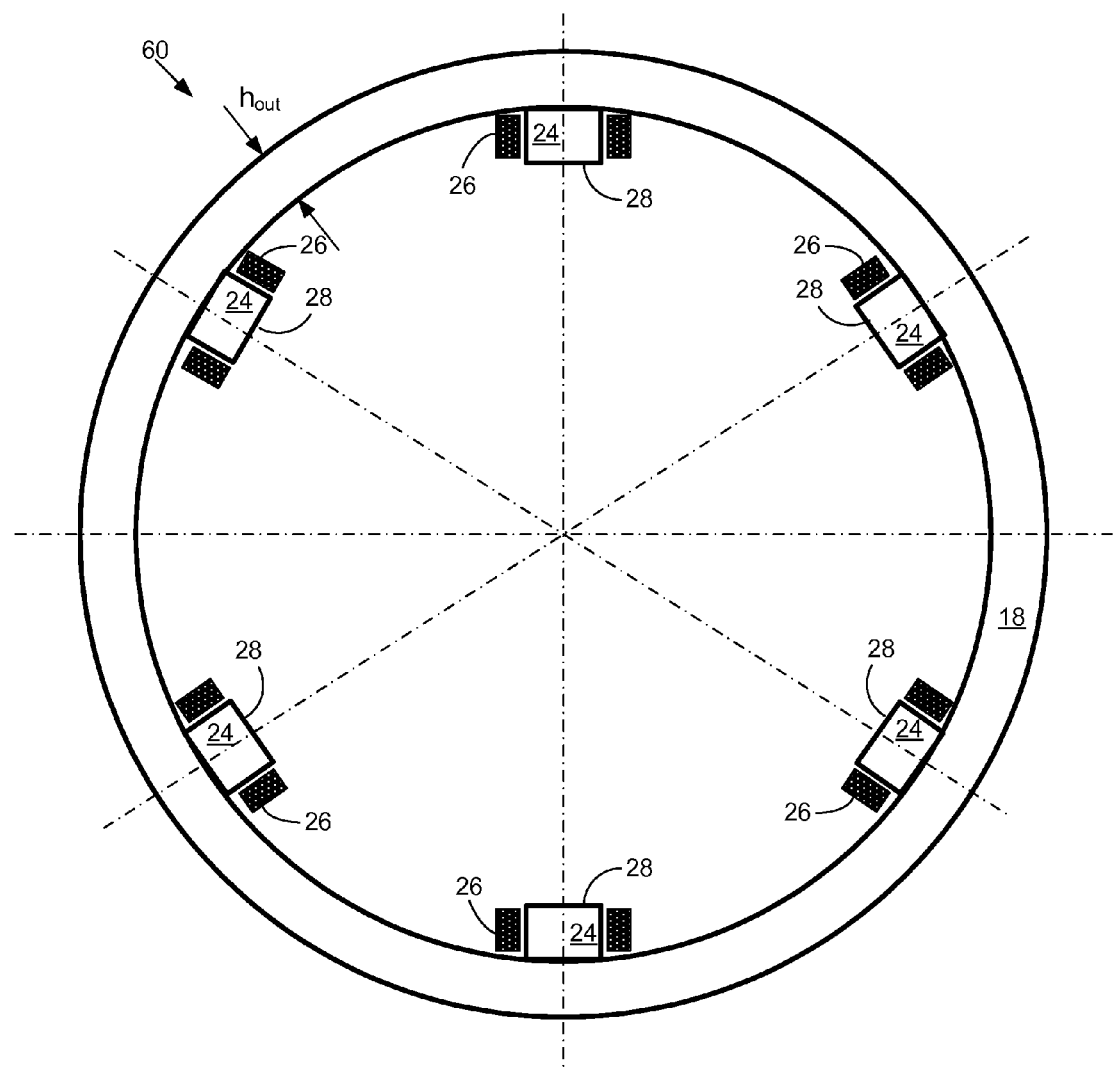
FIG. 8 is a detailed cut-away end view of an adaptor for a PMM according to a third possible embodiment of the invention.

FIG. 8 is a detailed cut-away end view of an adaptor 60 for a PMM (not shown) according to a third possible embodiment of the invention. It is simply the outer yoke 18 with associated multiple outer poles 24 and outer control windings 26 suitable for connection to a direct current control source, with distal ends 28 of the outer poles 24 in contact with an outer surface of the PMM to form an external magnetic flux circuit that diverts magnetic flux from the PMM magnetic flux circuit of the PMM. The adaptor 60 may be useful for converting a standard PMM to a regulated one for use in either a generating mode or motor mode.

The described embodiments of the invention are only some illustrative implementations of the invention wherein changes and substitutions of the various parts and arrangement thereof are within the scope of the invention as set forth in the attached claims.

The invention claimed is:

1. A permanent magnet machine (PMM) that comprises:
   a generally cylindrical permanent magnet (PM) rotor that comprises multiple PM rotor poles arranged around a rotor axis of rotation; and
   a stator with two generally cylindrical and concentric yokes, an inner yoke proximate the PM rotor with associated multiple inner poles and inner armature windings suitable for multiphase alternating current operation that form a PMM magnetic flux circuit, an outer yoke with associated multiple outer poles and outer control windings suitable for connection to a direct current source, with distal ends of the outer poles in contact with the inner yoke to form an external magnetic flux circuit that diverts magnetic flux from the PMM magnetic flux circuit;

wherein application of increasing direct current to the outer windings results in increased magnetic reluctance of the external magnetic flux circuit, thereby causing the external magnetic flux circuit to divert less magnetic flux from the PMM magnetic flux circuit.

2. The PMM of claim 1, wherein the number of outer poles is greater than or equal to the number of PM rotor poles.

3. The PMM of claim 1, wherein the inner poles and outer poles are salient poles.

4. The PMM of claim 3, wherein the inner armature windings and the outer control windings are concentrated coils of one slot coil pitch.

5. The PMM of claim 1, wherein the inner poles are non-salient poles and the outer poles are salient poles.

6. The PMM of claim 5, wherein slots in the inner yoke form the non-salient inner poles.

7. The PMM of claim 5, wherein the inner armature windings are distributed windings and the outer control windings are concentrated coils of one slot coil pitch.

8. The PMM of claim 1, wherein the outer control windings are series-connected.

9. The PMM of claim 1, wherein the outer control windings are parallel-connected.

10. The PMM of claim 1, wherein the magnetic reluctance of the inner yoke is greater than the magnetic reluctance of the outer yoke.

11. The PMM of claim 10, wherein the inner yoke and the outer yoke comprise a ferromagnetic material with magnetic permeability $\mu_1$ and the radial thickness of the inner yoke $h_{in}$ is thinner than the radial thickness of the outer yoke $h_{out}$.

12. The PMM of claim 11, wherein the radial thickness of the outer yoke $h_{out}$ is greater than or equal to approximately four times the radial thickness of the inner yoke $h_{in}$.

13. The PMM of claim 10, wherein the inner yoke comprises a ferromagnetic material with a magnetic permeability $\mu_1$ and the outer yoke comprises a ferromagnetic material with a magnetic permeability $\mu_2$ that is greater than the magnetic permeability $\mu_1$.

14. The PMM of claim 13, wherein the radial thickness of the inner yoke $h_{in}$ is approximately the same as the radial thickness of the outer yoke $h_{out}$ and the magnetic permeability $\mu_2$ is greater than or equal to approximately four times the magnetic permeability $\mu_1$.

15. The PMM of claim 1, wherein the PMM operates in an electrical generator mode and direct current applied to the outer control windings controls electromotive force (EMF) that the PMM generates.

16. The PMM of claim 1, wherein the PMM operates in an electrical motor mode and direct current applied to the outer control windings controls torque that the PMM develops.

17. For a permanent magnet machine (PMM) that comprises a generally cylindrical permanent magnet (PM) rotor comprising multiple PM rotor poles arranged around a rotor axis of rotation and a stator with a stator yoke proximate the PM rotor with associated multiple stator poles and armature windings suitable for multiphase alternating current operation that form a PMM magnetic flux circuit, an adaptor for regulating the PMM with a control current, comprising:

a ferromagnetic adaptor yoke with associated adaptor poles and adaptor control windings suitable for connection to a direct current source, with distal ends of the adaptor poles fitted over an outer surface of the PMM stator to form an external magnetic flux circuit that diverts magnetic flux from the PMM magnetic flux circuit;

wherein application of increasing direct current to the adaptor windings results in increased magnetic reluctance of the external magnetic flux circuit, thereby causing the external magnetic flux circuit to divert less magnetic flux from the PMM magnetic flux circuit.

18. The adaptor of claim 17, wherein the number of adaptor poles is greater than or equal to the number of PM rotor poles.

19. The adaptor of claim 17, wherein the adaptor poles are salient poles.

20. The adaptor of claim 17, wherein the adaptor windings are series-connected.

21. The adaptor of claim 17, wherein the magnetic reluctance of the adaptor yoke is greater than the magnetic reluctance of the PMM stator yoke.

22. The adaptor of claim 21, wherein the PMM stator yoke and the outer yoke comprise a ferromagnetic material with magnetic permeability $\mu_1$ and the radial thickness of the PMM stator yoke $h_{in}$ is thinner than the radial thickness of the adaptor yoke $h_{out}$.

23. The adaptor of claim 22, wherein the radial thickness of the adaptor yoke $h_{out}$ is greater than or equal to approximately four times the radial thickness of the PMM stator yoke $h_{in}$.

24. The adaptor of claim 21, wherein the PMM stator yoke comprises a ferromagnetic material with a magnetic permeability $\mu_1$ and the adaptor yoke comprises a ferromagnetic material with a magnetic permeability $\mu_2$ that is greater than the magnetic permeability $\mu_1$.

25. The adaptor of claim 24, wherein the radial thickness of the PMM stator yoke $h_{in}$ is approximately the same as the radial thickness of the adaptor yoke $h_{out}$ and the magnetic permeability $\mu_2$ is greater than or equal to approximately four times the magnetic permeability $\mu_1$.

* * * * *